(12) United States Patent
Susnow et al.

(10) Patent No.: US 6,745,353 B2
(45) Date of Patent: Jun. 1, 2004

(54) METHOD AND APPARATUS FOR SLIDING WINDOW LINK PHYSICAL ERROR DETECTION

(75) Inventors: Dean S. Susnow, Portland, OR (US);
Richard D. Reohr, Jr., Hillsboro, OR (US); Timothy Barilovits, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 506 days.

(21) Appl. No.: 09/809,443

(22) Filed: Mar. 15, 2001

(65) Prior Publication Data

US 2002/0133762 A1 Sep. 19, 2002

(51) Int. Cl.$^7$ .............................. H02H 3/05; G06F 11/00
(52) U.S. Cl. .......................................... 714/706; 714/56
(58) Field of Search ................. 714/704, 706, 714/707, 708, 712, 715, 819, 820, 821, 798, 56, 48, 43, 24

(56) References Cited

U.S. PATENT DOCUMENTS

| | | | |
|---|---|---|---|
| 4,730,313 A | * 3/1988 | Stephenson et al. | ........ 714/708 |
| 5,459,731 A | * 10/1995 | Brief et al. | ................. 714/704 |
| 5,467,341 A | * 11/1995 | Matsukane et al. | ......... 370/253 |
| 6,438,717 B1 | * 8/2002 | Butler et al. | ................. 714/704 |

* cited by examiner

*Primary Examiner*—Christine T. Tu
(74) *Attorney, Agent, or Firm*—Schwegman, Lundberg, Woessner & Kluth, P.A.

(57) ABSTRACT

Method and apparatus for link physical error tracking that includes a one or more shift registers, one or more counters, and a comparator. The shift register receives one or more status bits for an input data stream denoting whether bytes of the input data stream have a link physical error. The counter increments an error count when receiving at least one status bit that denotes a link physical error, and decrements the error count when receiving at least one status bit from an output of the shift register that denotes a link physical error. The comparator compares the error count with a maximum value. A retrain signal is generated if the error count becomes larger than or equal to the maximum value. The retrain signal may be used to signal that a connection between two nodes needs to be retrained to get the two nodes back into synchronization. Link physical errors that occur aligned and misaligned with a rising edge of a symbol clock are trackable.

26 Claims, 6 Drawing Sheets

METHOD AND APPARATUS FOR SLIDING WINDOW LINK PHYSICAL ERROR DETECTION

BACKGROUND

1. Field

This invention relates to link physical error detection, and more specifically to minor link physical error detection using sliding window methodology.

2. Background

In data transfers across a link between two nodes, many network protocols require the detection of physical or bit errors as an indication of link data integrity. An extensive number of physical errors indicate the link integrity is questionable. Interactions from the devices communicating across this link may be required to test and correct the link data integrity.

The Infiniband (IBA) protocol defines minor link physical errors to be occurrences of specific events that may jeopardize link quality. An Infiniband port may utilize either a single or double pumped data stream. It is the responsibility of all devices connected through an Infiniband protocol to monitor the occurrences of these events and to use this information to gauge current network quality. If during network operation, the network quality falls below a pre-described amount, the link between the two nodes is retrained. The Infiniband specification defines several events the occurrence of which may be considered minor link physical error events for an Infiniband link. These include: invalid 8B/10B code groups and running disparity errors; unsupported or disabled valid code groups; any control symbol within the boundaries of a packet; pad symbols on a non-12x link; start or end packet delimiter in wrong lane of multi lane link; or on a 12x link, PAD symbols not preceded by end of packet delimiter.

If any of these minor link physical error events occur, retraining may need to be performed to get the two nodes back into synchronization. During retraining, a data pattern may be sent from one node to a second node. The second node may receive the data pattern and then send another data pattern in response. This may continue between the links for a certain time until they both agree and arrive that the link is in a good state. The link may now be used for other information traffic outside of link training.

The Infiniband specification describes two link physical error threshold algorithms for tracking these occurrences. One of these algorithms is the sliding window algorithm. Under the sliding window algorithm, logic tracks the minor error status of the most recent sixteen symbol times. Moreover, an error threshold event may be reported when four or more minor errors are present within the sixteen most recent symbol times of history.

Therefore, a need exists for method and apparatus for minor link physical error tracking that implements a sliding window algorithm, and may be used with a single pumped or double pumped data stream, and also tracks minor link physical errors that may be misaligned with a symbol clock.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments (e.g., servers).

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention relates to methods and apparatus for tracking minor link physical errors that provides an implementation of a sliding window algorithm as described in the Infiniband architecture specification. In the present invention, a double pumped data stream may be converted to a single pumped data stream to allow detection of minor link physical errors. Moreover, minor link physical errors that occur misaligned with a symbol clock are also trackable under the present invention.

Figure 1:
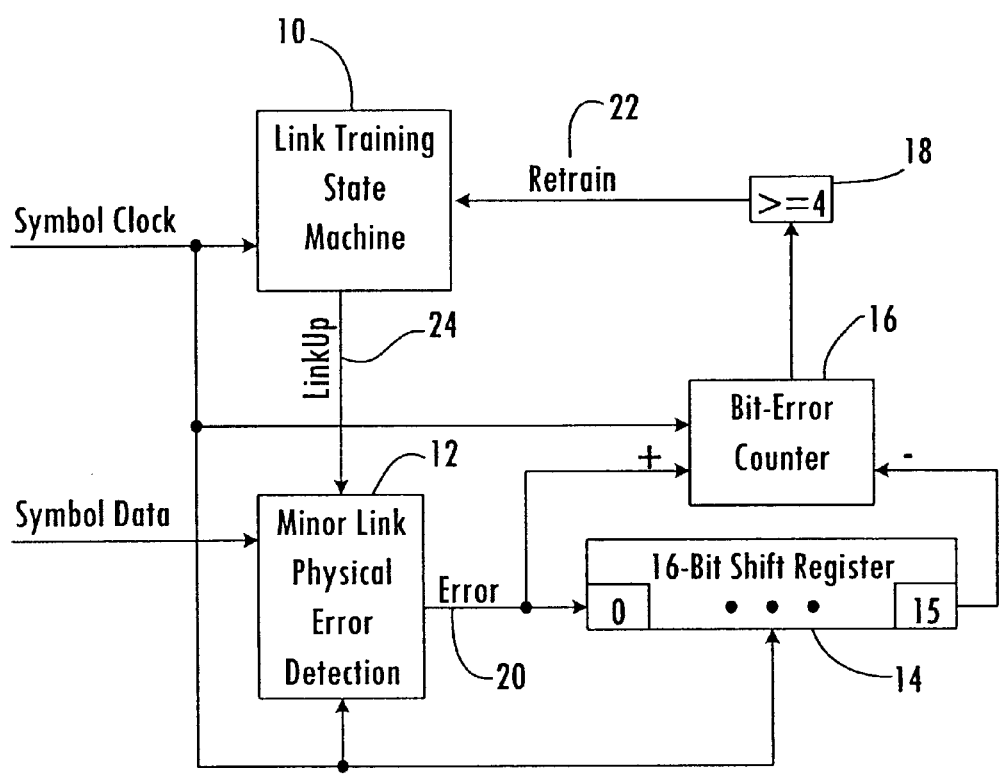
FIG. 1 is a block diagram of a minor link physical error tracking apparatus that implements a sliding window algorithm according to an example embodiment of the present invention.

FIG. 1 shows a block diagram of a minor link physical error tracking apparatus that implements a sliding window algorithm according to an example embodiment of the present invention. A minor link physical error detector 12 receives an input data stream consisting of symbol data. The minor link physical error detector 12 receives the symbol data and detects if there are any minor link physical errors. If a minor link physical error is detected, an error signal 20 is generated and sent to a shift register 14 and a bit error counter 16. Detector 12 and shift register 14 are clocked by a symbol clock which causes the error to be serially shifted upon each symbol clock through shift register 14 from the input of the shift register to an output of the shift register.

In this example embodiment, shift register 14 is a 16 bit shift register, therefore, after 16 symbol clocks, an error on signal line 20 will exist at the output of shift register 14 and be sent to bit error counter 16. If minor link physical error detector 12 does not detect an error, signal line 20 may be a '0' denoting that no error was detected. If signal line 20 is equal to a '1', this may denote that a minor link physical error was detected. Each error on signal line 20 causes bit error counter 16 to increment an error count. After a minor link physical error propagates through shift register 14, and is then fed to bit error counter 16, this causes bit error counter 16 to decrement the error count. Bit error counter 16 may also be clocked by the symbol clock.

A comparator 18 compares the number of errors from bit error counter 16 with a particular value. In this example embodiment, comparator 18 determines if the number of errors from counter 16 is larger than or equal to 4. If the number of errors in counter 16 is larger than or equal to 4, comparator 18 generates a retrain signal 22. Retrain signal 22 is sent to a link training state machine 10 to notify the state machine that the link between two nodes needs to be retrained to synchronize the two nodes. Link training state machine 10 may also be clocked by the symbol clock, and remove a link up signal 24 if it receives a retrain signal 22. An inactive link up signal 24 may disable error detector 12, therefore, preventing other errors from being clocked into shift register 14 and counter 16 during retraining.

Thus, error detector 12 may only be enabled when the corresponding link has been trained. The link up input signal, from state machine 10 may serve as a functional enable. When the link is up (i.e., trained), minor link physical errors are detected, otherwise, they may be ignored. Shift register 14 may be used to define the 16 most recent symbol times as indicated by the Infiniband specification. Counter 16 tracks the number of minor link physical errors occurring within the sliding window. If at any time counter 16 exceeds the prescribed error threshold, retrain signal 22 is asserted to force link recovery by state machine 10. Although this example embodiment is tailored to an Infiniband solution, the present invention may be programmable to allow use beyond the Infiniband specification and to other applications.

One caveat to the block diagram shown in FIG. 1 is that all logic must function within the symbol clock domain and that symbol data occurs coincident with the symbol clock. However, in actuality, it is possible that symbol data may be double pumped (i.e., valid symbol data occurring coincident with both edges of the symbol clock).

Figure 2:
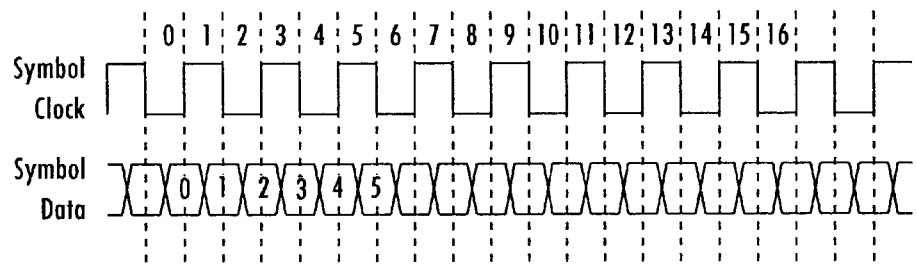
FIG. 2 is a timing diagram of a double pumped interface according to example embodiment of the present invention.

FIG. 2 shows a timing diagram of a double pumped interface according to an example embodiment of the present invention. The timing diagram shown in FIG. 2 may be used by many current serializer/deserializer (SERDES) devices. As shown in FIG. 2, symbol data is valid on the positive and negative edge of the symbol clock, therefore, a symbol detector has to run off of the positive and falling clock edges. The problem with a typical link interface is that symbol data is valid on both edges of the symbol clock. In order for the circuit in FIG. 1 to operate properly, it may be required that all synchronous logic be clocked with both the rising and falling edges of the symbol clock. However, this may not be possible. Moreover, all digital synchronous logic inside a device should run off a single edge of a clock. To correct this, the data path width is doubled and the input data stream is run at one half the frequency (i.e., two bytes of symbol data per clock). There may be two symbol errors maximum per two bytes of symbol data. Therefore, a double pumped data stream may be converted to a single pumped data stream (i.e., 2× data width) at one half the frequency of the input (i.e., double pumped) data stream. This enables all synchronous logic in FIG. 1 to be clocked off a single edge of the symbol clock.

Figure 3:
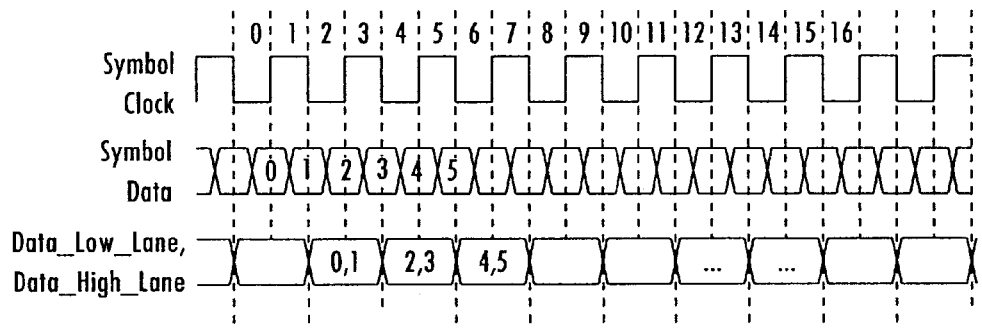
FIG. 3 is a timing diagram of a double to single pumped data stream conversion according to an example embodiment of the present invention.

FIG. 3 shows a timing diagram of a double to single pumped data stream conversion according to an example embodiment of the present invention. As shown in FIG. 3, two bytes of symbol data, e.g., byte 0 and byte 1, may be buffered and presented together at one half the normal frequency such that byte 0 (i.e., data low lane), and byte 1 (data high lane) may be clocked in on a rising edge of the symbol clock. Therefore, symbol data containing bytes of a double pumped data stream normally clocked on a rising edge and failing edge of a symbol clock, may be converted to a single pumped data stream whereby two bytes are clocked on each rising edge of a symbol clock.

Figure 4:
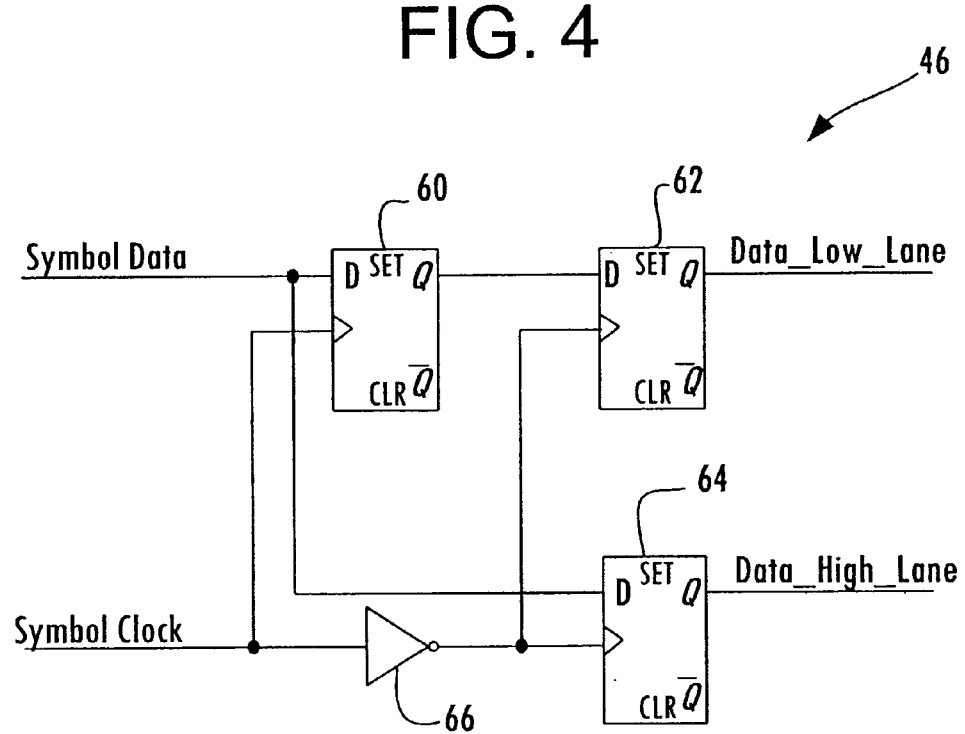
FIG. 4 is a schematic diagram of a circuit for double pumped to single pumped conversion according to an example embodiment of the present invention.

FIG. 4 shows a schematic diagram of a circuit for double pumped to single pumped conversion according to an example embodiment of the present invention. Circuit 46 may be buffers, or as shown in FIG. 4, a plurality of flip flops 60, 62 and 64 along with one or more logic gates 66. In this example embodiment, a symbol clock clocks flip flop 60, whereas the inversion of the symbol clock (i.e., opposite edge) clocks flip flops 62 and 64. Symbol data being received by the first flip flop 60 is clocked in and then fed to the second flip flop 62. The output of flip flop 62 produces the data low lane signal (i.e., low byte). The symbol data is also clocked into the input of flip flop 64, however, it is clocked with the opposite edge, (e.g., falling edge), due to inverter 66. Therefore, the output of flip flop 64 produces the high byte data or data high lane. The data low lane from the output of flip flop 62 and the data high lane form the output of flip flop 64 are valid at these outputs at the same time and may then be presented in parallel to the next stage of processing. Although flip flop devices are shown in this example embodiment, other storage type or other logic devices (e.g., gates, buffers, memories, etc.) may also be used to perform this function and still be within the spirit and scope of the present invention.

Figure 5:
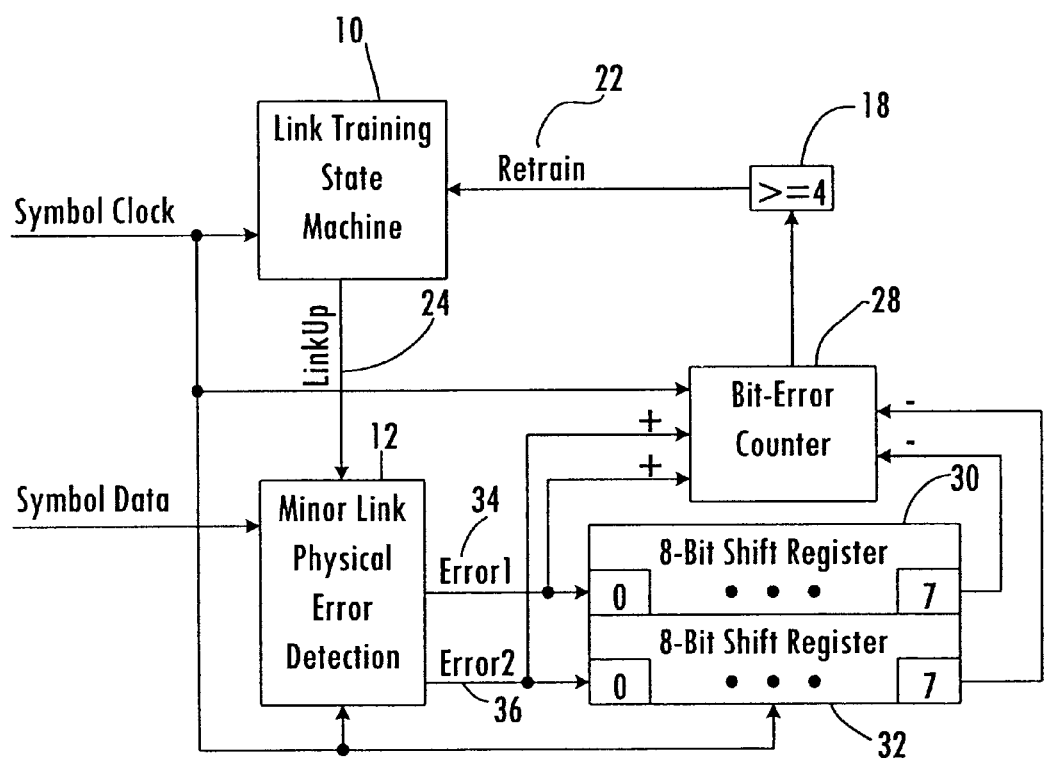
FIG. 5 is a block diagram of an example minor link physical error tracking apparatus for a single pumped data stream according to an example embodiment of the present invention.

FIG. 5 shows a block diagram of an example minor link physical error tracking apparatus for a single pumped data stream according to an example embodiment of the present invention. The FIG. 5 operates functionally similar to that in FIG. 1, but enables all synchronous logic to be clocked on a single edge of a symbol clock. The architecture in FIG. 5 differs from that in FIG. 1 in that error detector 12 detects errors on two bytes of the input data stream simultaneously, therefore, detecting the possibility of an error for each byte.

Thus, an error1 signal 34 and an error2 signal 36 are generated by error detector 12 signifying a minor link physical error on a low byte or on a high byte of the symbol data respectively.

Further, FIG. 5 differs from FIG. 1 in that FIG. 5 contains two shift registers 30 and 32. In contrast to FIG. 1 where a 16 bit register defines the sampling window, in FIG. 5, an 8 bit shift register defines the sampling window. This is viable since the data stream is now two bytes wide instead of one. The detector has been enhanced to detect minor link physical error occurrences on either lane (high or low) of the input data stream. Bit error counter 28 is now enhanced to support two increment inputs and two decrement input control lines. Counter 28 still maintains a single error count, however, it is now based on receiving possibly two minor link physical errors per symbol clock. Comparator 18 receives the error count in counter 28 and if the error count in counter 28 is larger than or equal to 4, comparator 18 generates a retrain signal 22 to link training state machine 10. Therefore, shift register 30 may detect the 8 most recent low lane minor link physical errors, whereas, shift register 32 may detect the 8 most recent high lane minor link physical errors. If two simultaneous minor link physical errors occur, counter 28 increments twice. Similarly, if two simultaneous minor link physical errors have been shifted through both shift register 30 and shift register 32 and output to counter 28, counter 28 decrements the error count twice. Therefore, both the error1 signal 34 and the error2 signal 36 may increment the error count or decrement the error count of counter 28.

The Infiniband specification requires that four or more errors within the 16 most recent symbol times trigger a retraining event. However, it is possible that a corner case in which exactly four errors occur within a 16 symbol boundary may not be detected. This may be due to the double to single pumped data conversion format. It is possible that a 16 symbol boundary window spans either 8 or 9 symbol clocks depending upon the lane location (high or low) of the first minor link physical error defining the starting point of the sampling window. Thus, the location of the first minor link physical error in the data stream may determine whether the sample window is aligned or misaligned.

Figure 6:
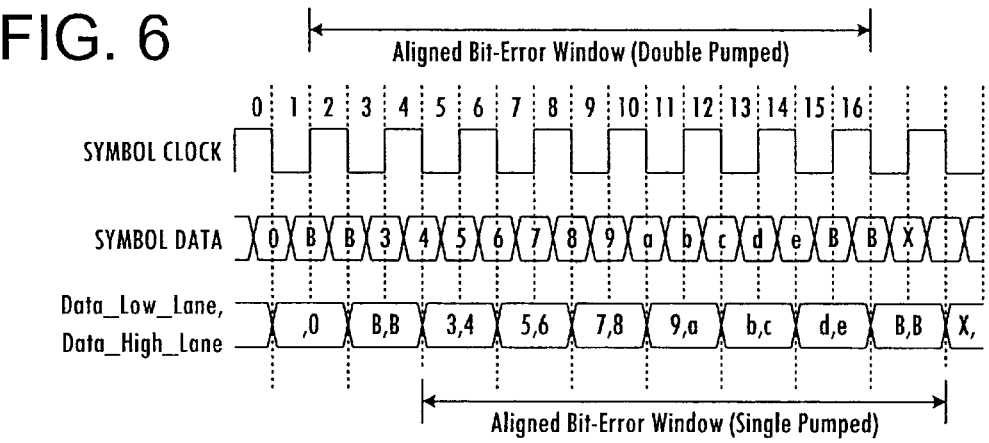
FIG. 6 is a timing diagram of an aligned sample window according to an example embodiment of the present invention.

FIG. 6 shows a timing diagram of an aligned sample window according to an example embodiment of the present invention. A 'B' denotes a minor link physical error, whereas a number (e.g., '4') denotes valid data and no error. The top waveform is the symbol clock, the middle data is the double pumped data stream and the bottom data is the singled pumped data stream. In an aligned sample window, the first invalid character (i.e., minor link physical error, 'B') occurs coincident with a rising edge of a symbol clock. Note that the first 'B' in the symbol data occurs on a rising edge of the symbol clock. This is in the double pumped symbol data stream. The 16 symbol error window is depicted in cycles 1–16 noted at the top of the figure. FIG. 6 shows four occurrences of minor link physical errors within the 16 symbol time boundary. These errors are determined to be aligned since the 4 errors span 8 clocks (single pumped window) due to the fact that the first error occurs coincident with the rising edge of the symbol clock. When the sampling window is aligned, the circuit shown in FIG. 6 operates appropriately, however, malfunctions may occur during misaligned sampling windows.

Figure 7:
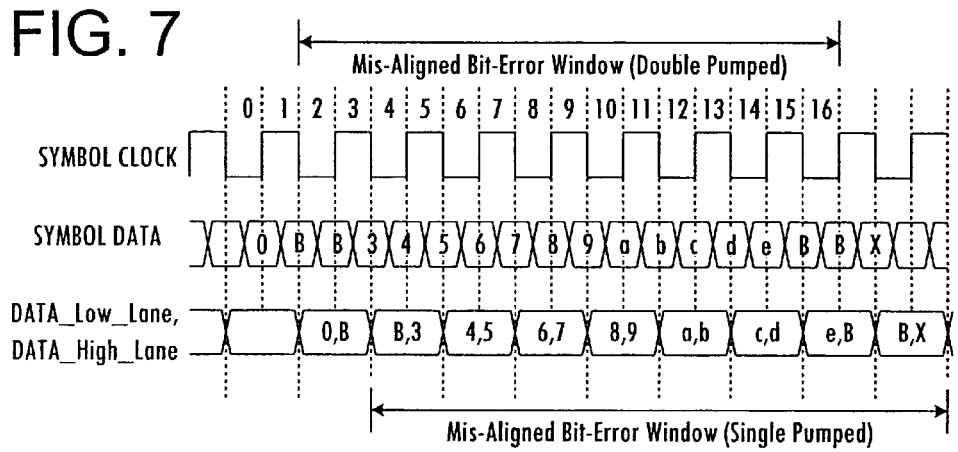
FIG. 7 is a timing diagram of a misaligned sample window according to an example embodiment of the present invention.

FIG. 7 shows a timing diagram of a misaligned sample window according to an example embodiment of the present invention. In a misaligned sample window, the first minor link physical error occurs on a falling edge of the symbol clock. The 16 symbol error window is depicted in cycles 1–16. The 'B's in the timing diagram depict symbols that contain minor link physical errors. Four occurrences of minor link physical errors are shown in FIG. 7 to occur within the 16 symbol time boundary. FIG. 7 is a misaligned sample window since the minor link physical errors span 9 clocks due to the fact that the first error occurs coincident with the falling edge of the symbol clock. If the sampling window is misaligned, it is possible that a link retraining may not be initiated (although needed). This is because only an 8 bit shift register may be implemented that doesn't account for the corner case in which the window is misaligned. If one was to follow the double pumped data stream as it is converted into a single pumped data stream and track the minor link physical errors (i.e., 'B's) as they are counted in counter 28, one would note that the counter would count the first B and the next two, therefore, having a value of 3 at the end of the 16th double pumped window. The last 'B' in the double pumped data stream now should cause the counter to be incremented to four, however, the first 'B' coming out of the shift register causes the counter to decrement the error count. Therefore, the error count remains at three (since the increment and decrement cancel each other), when it should be four. This is due to the misaligned sample window.

Figure 8:
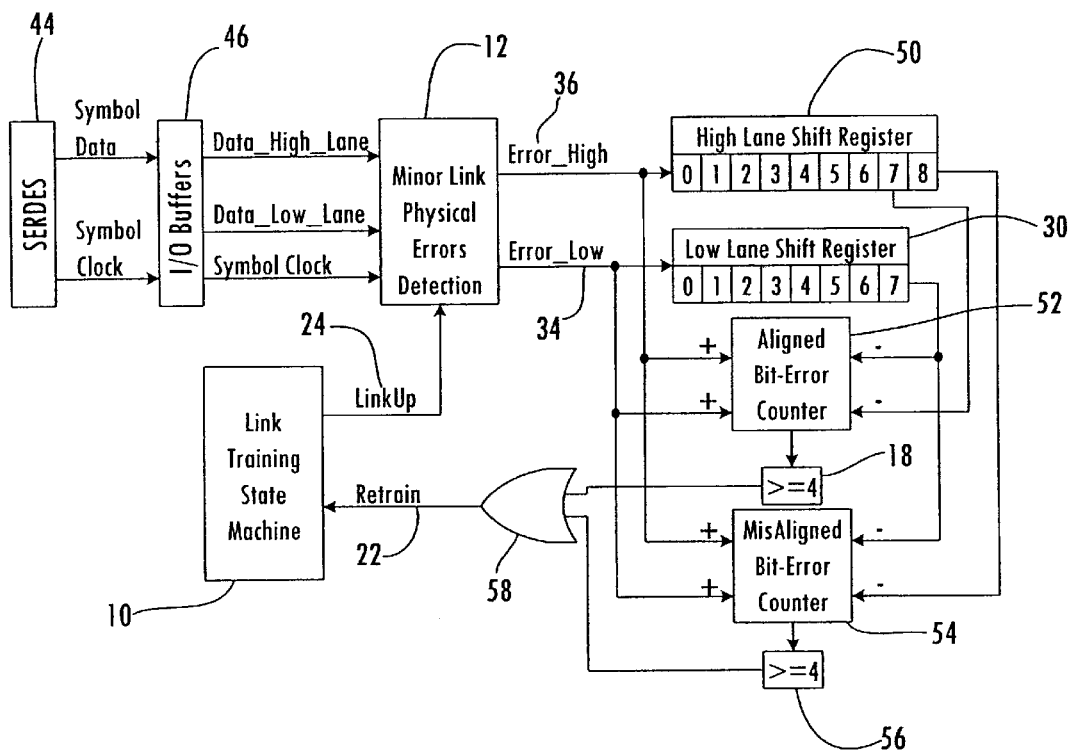
FIG. 8 is a block diagram of a minor link physical error tracking apparatus according to another embodiment of the present invention.

FIG. 8 shows a block diagram of a minor link physical error tracking apparatus according to another embodiment of the present invention. The circuit FIG. 8 handles data errors that may occur misaligned with the rising edge of the symbol clock. FIG. 8 also includes logic that may proceed error detector 12. This includes a serializer/deserializer (SERDES) 44, that sends the symbol data and symbol clock to I/O buffers 46. I/O buffers 46 convert the double pumped symbol data into single pumped symbol data on a high lane and a low lane. The high lane symbol data and the low lane symbol data and symbol clock are then sent to minor link physical error detector 12. Detector 12 detects minor link physical errors on the high lane symbol data and the low lane symbol data and generates a bit denoting whether there was an error 36 in the high lane symbol data, or an error 34 in the low lane symbol data. High lane error 36 may be fed into a shift register 50, whereas low lane error 34 may be sent to shift register 30. Shift register 50 is now 9 bits long, therefore, allowing detection of errors that occur across both aligned and misaligned sampling windows.

FIG. 8 also includes two counters 52 and 54 that track aligned sequences and misaligned sequences respectively. Comparators 18 and 56 compare the errors accumulated in counters 52 and 54, respectively to determine if either error count is larger than or equal to four. The outputs of comparator 18 and 56 are sent to a logic gate 58 that then generates a retrain signal 22 if either of the error counts in counter 52 or 54 are larger than or equal to 4. Each counter is independently compared to the prescribed value and a retrain signal generated based on a logical OR of the two associated comparators. Therefore, with the addition of minimal logic gates the circuit in FIG. 5 may be enhanced to support all possible permutations of errors occurring across a 16 symbol time boundary. The present invention allows the external data stream to be double pumped and a single clock to be used for all synchronous circuitry.

Methods and apparatus according to the present invention provide efficient means of tracking and responding to minor link physical errors. The present invention implements a sliding window algorithm and solves the problem for both a single pumped and double pumped data stream. The present invention may also be extended into other applications that desire to track frequency of events with a variable window.

In methods and apparatus according to the present invention, the hardware overhead is minimal (e.g., shift register, counters, and comparators, etc.) and add absolutely no additional latency to the data stream. The present invention is completely synchronous and has been optimized to achieve very high performance. In methods and apparatus according to the present invention, the circuits reside in parallel with the data path and place no additional logic loading on that path.

It will be appreciated by one skilled in the art that although certain circuits, logic devices, etc., have been shown to illustrate the present invention, the present invention is in no way limited by these example embodiments. Other devices or electronic circuits may be used that implement the present invention and still be within the spirit and scope of the present invention. For example, the shift registers may be of other lengths depending on the particular application used to implement the present invention. Further, the error count may be programmable such that the comparator may only generate a retrain signal or similar signal when a count is reached on some other value other than four as shown in example embodiments of the present invention. Moreover, although the present invention has been illustrated using an Infiniband application, the present invention is not limited to this application and may be extended to any application that desires to track X occurrences of any event within the most recent Y cycles.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. An apparatus for link physical error tracking comprising:
    a first shift register, the first shift register receiving a first status bit for each low byte symbol data of an input data stream denoting whether the low byte symbol data has a link physical error;
    a second shift register, the second shift register receiving a second status bit for each high byte symbol data of the input data stream denoting whether the high byte symbol data has a link physical error;
    a first counter, the first counter incrementing a first error count when receiving at least one of the first status bit and the second status bit that denote an error and decrementing the first error count when receiving at least one of the first status bit from the output of the first shift register and the second status bit from an output of the second shift register that denote an error; and
    a second counter, the second counter incrementing a second error count when receiving at least one of the first status bit and the second status bit that denote an error and decrementing the second error count when receiving at least one of the first status bit from the output of the first shift register and the second status bit from a second output of the second shift register that denote an error; and
    a comparator, the comparator comparing the first error count and the second error count with a maximum value, a retrain signal being generated if the first error count or the second error count become larger than or equal to the maximum value.

2. The apparatus according to claim 1, wherein the first shift register comprises an eight bit shift register.

3. The apparatus according to claim 1, wherein the second shift register comprises a nine bit shift register, the second shift register providing the tracking of link physical errors that occur misaligned with a rising edge of a symbol clock.

4. The apparatus according to claim 1, wherein the maximum value is programmable.

5. The apparatus according to claim 1, wherein the maximum value is four.

6. The apparatus according to claim 1, wherein the low byte data and the high byte data each comprise ten bits.

7. The apparatus according to claim 1, wherein the retrain signal notifies a state machine to retrain a connection between two nodes to get the two nodes back into synchronization.

8. The apparatus according to claim 1, further comprising an error detector, the error detector receiving the input data stream, detecting any link physical errors, and generating the first status bit and the second status bit based on the detecting.

9. The apparatus according to claim 8, further comprising a controller, the controller receiving the retrain signal and disabling the error detection based on the retrain signal.

10. The apparatus according to claim 1, wherein the input data stream is a single pumped data stream.

11. The apparatus according to claim 1, further comprising a converter, the converter converting a double pumped data stream into the input data stream where the input data stream is a single pumped data stream.

12. A method for link physical error tracking comprising:
    receiving a first status bit for each low byte symbol data of an input data stream denoting whether the low byte symbol data has a link physical error;
    receiving a second status bit for each high byte symbol data of the input data stream denoting whether the high byte symbol data has a link physical error;
    incrementing at least one error count when receiving at least one of the first status bit and the second status bit that denote an error;
    decrementing at least one error count when receiving a delayed version of at least one of the first status bit and the second status bit that denote an error; and
    generating a retrain signal if the at least one error count becomes larger than or equal to a maximum count,
    notifying a state machine to retrain a connection between two nodes to get the two nodes back into synchronization, the notifying being based on the retrain signal; and
    wherein link physical errors that occur aligned and misaligned with a rising edge of a symbol clock are trackable.

13. The method according to claim 12, further comprising receiving a single pumped data stream at an error detector before the receiving the first status bit and the receiving the second status bit, the error detector generating the first status bit and the second status bit.

14. The method according to claim 13, further comprising converting the input data stream from a double pumped data stream to a single pumped data stream before the receiving the single pumped data stream.

15. The method according to claim 12, further comprising detecting any link physical errors in the input data stream and generating the first status bit and the second status bit based on the detecting before the receiving the first status bit and the receiving the second status bit.

16. The method according to claim 15, further comprising disabling the error detection based on the retrain signal.

17. An apparatus for link physical error tracking comprising:
- at least one shift register, the at least one shift register receiving at least one status bit for an input data stream denoting whether bytes of the input data stream have a link physical error;
- at least one counter, the at least one counter incrementing an error count when receiving at least one status bit that denotes a link physical error, and decrementing the error count when receiving the at least one status bit from an output of the at least one shift register that denotes a link physical error; and
- a comparator, the comparator comparing the error count with a maximum value, a retrain signal being generated if the error count becomes larger than or equal to the maximum value.

18. The apparatus according to claim 17, wherein the at least one shift register further comprises a first shift register and a second shift register, the second shift register allowing the tracking of link physical errors that occur misaligned with a rising edge of a symbol clock.

19. The apparatus according to claim 18, wherein the first shift register comprises an eight bit shift register.

20. The apparatus according to claim 18, wherein the second shift register comprises a nine bit shift register.

21. The apparatus according to claim 18, wherein one at least one status bit is received for each byte of the input data stream.

22. The apparatus according to claim 18, wherein the maximum value is four.

23. The apparatus according to claim 18, further comprising an error detector, the error detector receiving the input data stream, detecting any link physical errors, and generating the at least one status bit based on the detecting.

24. The apparatus according to claim 23, further comprising a controller, the controller receiving the retrain signal and disabling the error detection based on the retrain signal.

25. The apparatus according to claim 23, wherein the input data stream is a single pumped data stream.

26. The apparatus according to claim 18, further comprising a converter, the converter converting a double pumped data stream into the input data stream where the input data stream is a single pumped data stream.

* * * * *